March 24, 1959   C. A. STRATTON   2,879,229
CLAY-THICKENED LUBRICANTS AND THE PREPARATION THEREOF
Filed Aug. 18, 1955
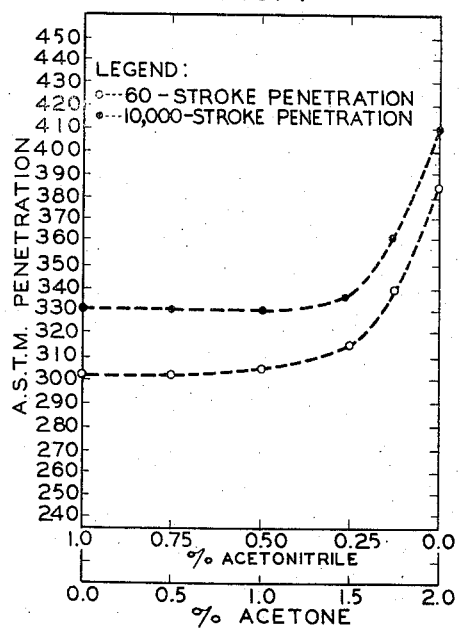
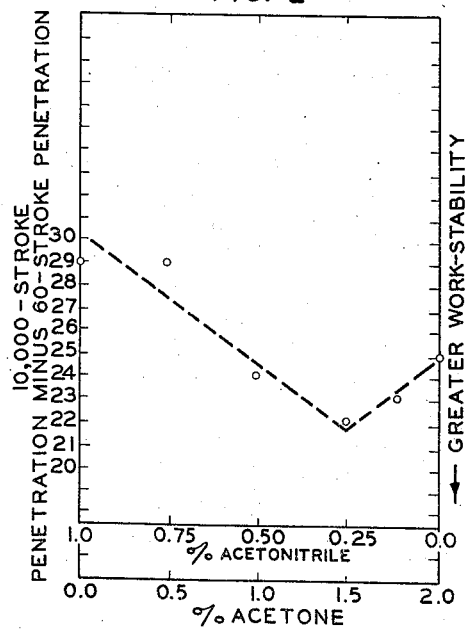
INVENTOR.
C.A. STRATTON
BY
ATTORNEYS

United States Patent Office 2,879,229
Patented Mar. 24, 1959

2,879,229

CLAY-THICKENED LUBRICANTS AND THE PREPARATION THEREOF

Charles A. Stratton, Caney, Kans., assignor to Phillips Petroleum Company, a corporation of Delaware Application August 18, 1955, Serial No. 529,131

15 Claims. (Cl. 252—21)

This invention relates to new and improved lubricants. In one of its aspects, this invention relates to lubricants bodied by a dispersion of organophilic bentonite in a lubricating liquid. In another of its aspects, it relates to lubricants bodied by a dispersion of organophilic bentonite in a lubricating liquid employing a novel dispersion agent. In another of its aspects, it relates to a method of preparing lubricants bodied by a dispersion of organophilic bentonite in a lubricating liquid employing a novel dispersion agent.

Recently there has been developed a type of bodied lubricant wherein an organophilic clay is colloidally dispersed in an organic lubricating liquid so as to obtain a gel or "grease." The clays which are useful as starting material for making the organophilic clay of these new bodied lubricants, are those exhibiting substantial base-exchange properties. Such clays include the montmorillonites such as sodium, potassium, lithium, and magnesium bentonites. The Wyoming type bentonite (sodium bentonite) is preferred. Other clays which are adapted for utilization as organophilic clays include saponite, montronite and attapulgite, particularly that of the Georgia-Florida type.

An organophilic bentonite, commonly used in the manufacture of bodied lubricants from lubricating oils, is formed by replacing the exchangeable inorganic cations of the bentonite with organic cations from salts, such as the hydrochlorides, of aliphatic, cyclic, aromatic and heterocyclic amines which may be primary, secondary, or tertiary amines, and polyamines, and quaternary ammonium compounds, such as dimethyldicetyl ammonium hydroxide. The bentonite is first hydrated in a very dilute dispersion so as to separate the unit particles and is then purified by super-centrifuging so as to achieve complete removal of non-clay impurities which would impart an abrasive character to the finished product. The reactive exchangeable inorganic cation, such as sodium, potassium, or magnesium, of the dispersed bentonite is replaced by the addition of the salt referred to above and the modified clay is then filtered, washed, and dried and ground into a fine powder. Increasing the chain length of the alkyl ammonium cation used to replace the exchangeable inorganic cation, increases the organophilic properties of the modified bentonite. A more complete disclosure of the preparation of organophilic bentonite will be found in U.S. Patent 2,531,427 issued to E. A. Hauser.

It is an object of this invention to provide an improved bodied lubricant.

It is another object to provide a method for producing an improved bodied lubricant.

Another object of the invention is to provide a lubricant bodied by an organophilic bentonite.

Another object of the invention is to provide a lubricant bodied by dispersing an organophilic bentonite in an organic lubricating liquid, such as a paraffinic lubricating oil, with a novel dispersion agent.

Other and further objects of this invention will be apparent to one skilled in the art upon study of the accompanying disclosure.

Broadly speaking, this invention comprises the bodying of an organic lubricating liquid with an organophilic bentonite clay in the presence of a mixture of acetone and acetonitrile or a mixture of propionitrile and acetone as a dispersion agent. The use of such a dispersion agent results in a grease which has good consistency and also good work stability. Specifically, the lubricating grease of this invention consists essentially of 2 to 15 weight percent of organophilic bentonite, 0.5 to 3 weight percent dispersant and the remainder an organic lubricating liquid, preferably a paraffinic lubricating oil. The percentages given are based on the weight of the grease produced. The novel feature of the lubricating grease is the dispersant utilized. The dispersant is made up of about 1.5 to about 35 weight percent of the nitrile, the remainder being acetone.

The organophilic bentonites preferred for use in this invention are those obtained by reacting a bentonitic clay with an aliphatic amine salt in which the aliphatic portion of the amine is preferably a carbon chain of from 10 to 18 carbon atoms. These organophilic bentonites are well known and one commercial example is "Bentone 34"[1].

The organic lubricating oils applicable in this invention are the lubricating oils derived from petroleum. The lubricating oils derived from paraffin-base crudes are preferred, such as those possessing a viscosity at 210° F. of from about 35 to about 225 SUS, preferably from about 45 to about 110 SUS.

The lubricants of this invention are ordinarily produced by making a slurry of the organophilic bentonite and lubricating oil to be used, introducing the desired amount of dispersant, and milling the mixture in a colloid mill. Milling at a high rate of shear results in dispersal of the organophilic bentonite in the oil to form a grease.

Better understanding of this invention will be obtained upon reference to the following specific example which is meant to be exemplary and not to be unduly limiting of the invention.

EXAMPLE I

Several comparative greases were formed in the following manner. "Bentone 34" was added to an SAE-20 paraffinic lubricating oil in the proportions shown in Table I below. The "Bentone 34" was allowed to become wetted by the oil and settle therein. The mixture was thereafter stirred in a mixer for 5 minutes to effect a uniform slurry. This slurry was then dispersed with acetonitrile, acetone, and mixtures of the two in the amounts shown in Table I below. The mixture was then milled in a Charlotte mill, model ND-1 with a three horse-power motor and T-grooved rotor and stator at 0.003 inch clearance and at a flow rate of 257 ml./min.

*Table I*

| | Composition of Greases, Wt. Percent | | | | | |
|---|---|---|---|---|---|---|
| Grease No. | 1 | 2 | 3 | 4 | 5 | 6 |
| "Bentone 34" | 5.50 | 5.50 | 5.50 | 5.50 | 5.50 | 5.50 |
| Paraffinic SAE 20 oil | 93.50 | 93.25 | 93.00 | 92.75 | 92.62 | 92.50 |
| Acetonitrile | 1.00 | 0.75 | 0.50 | 0.25 | 0.125 | 0.00 |
| Acetone | 0.00 | 0.50 | 1.00 | 1.50 | 1.75 | 2.00 |

The following penetrations were measured on the greases of Table I:

---
[1] Trademark of National Lead Co., commercial grade dimethyldicetyl ammonium bentonite.

Table II

| Grease No | A.S.T.M. Standard Penetration | | | | | |
|---|---|---|---|---|---|---|
| | 1 | 2 | 3 | 4 | 5 | 6 |
| 60-strokes | 302 | 302 | 307 | 314 | 339 | 386 |
| 10,000-strokes | 331 | 331 | 331 | 336 | 362 | 411 |

Graph I is a plot of the penetrations of the various greases of Table I at 60 and 10,000 strokes. NLGI (National Lubricating Grease Institute) Grade One grease has a 60 stroke penetration limit of 310 to 340. Graph I discloses that with a fixed amount of organophilic bentonite (5.5 weight percent) dispersed in the lubricating oil stock a Grade One grease is produced when utilizing solely the relatively expensive acetronitrile. However, by decreasing the quantity of the expensive acetonitrile and adding the relatively inexpensive acetone so that the dispersion agent consists of a mixture of acetonitrile and acetone, it is readily seen, quite surprisingly, that the grease still meets the NLGI Grade One specification requirement. Moreover, when the acetonitrile is further decreased to about 35 weight percent with the remainder consisting of acetone in the dispersion agent mixture, the 10,000 stroke penetration also approaches the 60 stroke penetration. This is desirable since the smaller the difference between the 60 stroke and 10,000 stroke penetrations, the greater will be the work stability of the grease in question. Further decrease of the acetonitrile to about 10 weight percent of the dispersion agent mixture reveals a grease within the NLGI specification requirement. Thus, Graph I discloses that the quantity of the expensive acetonitrile in the dispersion agent mixture can be decreased and the quantity of the inexpensive acetone can be increased therein to produce a grease possessing superior qualities than either acetone alone, or acetonitrile alone, with a preferred range of the acetonitrile consisting of 10–35 weight percent of the dispersion agent mixture.

Graph II is a plot of the difference between the 10,000 stroke penetration and 60 stroke penetration, this difference representing the work stability, since the lower the penetration number difference, the greater being the work stability of the grease. It is readily seen from Graph II that the maximum work stable greases are produced from the mixed dispersants wherein the acetonitrile constitutes from about 1.5 to about 35 weight percent of the dispersant mixture, the preferred range constituting about 10 to about 35 weight percent of acetonitrile based on the dispersant mixture.

As stated previously, NLGI (National Lubricating Grease Institute) Grade One grease has a 60 stroke penetration limit within the range of between 310 and 340. Also, it is desirable that the grease have sufficient work stability to cause the 10,000 stroke penetration to fall on or below 355. Referring to Tables I and II, it is apparent that those greases which exhibit the highest consistency and good work stability result from the greases formed by employing a dispersant consisting of about 5 to about 35 weight percent of acetonitrile, the remainder being acetone.

Moreover, when merely employing acetone as the dispersion agent it is necessary to increase the quantity of organophilic thickener (bentonite) so that the final grease product will fall within the NLGI Grade One grease penetration limits. Since the organophilic bentonite thickener is the most expensive ingredient and constitutes about half the cost of the grease, any reduction in the required amount of organophilic bentonite results in decreased costs in preparing the grease. The following comparison is shown to illustrate the economic value of the invention.

| | Ingredient, percent | Cost, $/lb. grease | Ingredient, percent | Cost, $/lb. grease |
|---|---|---|---|---|
| "Bentone 34" | 6.5 | 0.0390 | 5.5 | 0.0330 |
| KC 20 oil [1] | 91.5 | 0.0209 | 92.75 | 0.0212 |
| Acetone | 2.0 | 0.0021 | 1.50 | 0.0016 |
| Acetonitrile | | | 0.25 | 0.0011 |
| Total Cost | | 0.0620 | | 0.0569 |
| Penetration, 60 strokes | 329 | | 314 | |

[1] KC 20 oil = a lubricating oil blending stock meeting SAE-20 viscosity specifications.

As stated previously, to meet the requirements of NLGI Grade One grease the 60 stroke penetration limit must be within a range of 310 to 340. When using mixed dispersants (acetonitrile and acetone), only 5.5 weight percent of "Bentone 34" was required to produce a NLGI Grade One grease having a 60 stroke penetration of 314. However, it required more (6.5 weight percent) of the relatively expensive "Bentone 34" to produce a NLGI Grade One grease having a 60 stroke penetration of 329 when acetone was the sole dispersant used.

Thus, the cost of the grease employing a mixture of acetronitrile and acetone as the dispersant is reduced 0.51 cent per pound. This reduction in cost, at first blush, does not appear too large; however, many custom grease manufacturers operate on a profit margin of a one-quarter cent per pound. Hence, the above saving becomes a very significant item under such conditions.

While the invention describes the preparation and composition of a grease containing an organophilic clay, an organic lubricating liquid, and a novel dispersion agent, it is considered obvious and within the skill of one skilled in the art to incorporate various additives into the novel grease, such as rust preventives or oxidation inhibitors. Other reasonable modifications of the invention can be made or carried out in the light of the above disclosure without departing from the spirit or scope of said disclosure.

I claim:

1. A bodied lubricant consisting essentially of hydrocarbon lubricating oil; organophilic bentonite in a proportion sufficient to thicken said oil to grease consistency, said bentonite having been rendered organophilic by replacing the exchangeable inorganic cations of the bentonite with organic cations from salts of organic compounds selected from the group consisting of amines, polyamines and quaternary ammonium compounds; and about 0.5 to 3 weight percent dispersion agent of acetone and a compound selected from the group consisting of acetonitrile and propionitrile, said dispersion agent being about 1.5 to about 35 weight percent nitrile and the remainder acetone.

2. A bodied lubricant consisting essentially of about 80 to 97 weight percent hydrocarbon lubricating oil; about 2 to 15 weight percent organophilic bentonite, said bentonite having been rendered organophilic by replacing the exchangeable inorganic cations of the bentonite with organic cations from salts of organic compounds selected from the group consisting of amines, polyamines and quaternary ammonium compounds; and about 0.5 to 3 weight percent dispersion agent of acetone and a compound selected from the group consisting of acetonitrile and propionitrile, said dispersion agent being about 1.5 to about 35 weight percent nitrile and the remainder acetone.

3. The lubricant of claim 1 wherein the dispersion agent is a mixture of acetone and acetonitrile.

4. The lubricant of claim 1 wherein the dispersion agent is a mixture of acetone and propionitrile.

5. The lubricant of claim 1 wherein the organophilic bentonite clay is obtained by reacting a bentonitic clay with an aliphatic amine salt in which the aliphatic portion of the amine is a carbon chain of 10 to 18 carbon atoms.

6. A bodied lubricant according to claim 2 wherein said hydrocarbon lubricating oil is a petroleum-derived paraffinic lubricating oil.

7. The lubricant of claim 3 wherein the acetonitrile is present in an amount of about 10 to about 30 weight percent of the dispersion agent mixture.

8. The lubricant of claim 6 wherein said petroleum-derived paraffinic lubricating oil has a viscosity at 210° F. from about 35 to about 225 SUS.

9. In a process for manufacturing a bodied lubricant wherein sufficient organophilic bentonite is dispersed in a hydrocarbon lubricating oil to thicken said oil to a grease consistency, said bentonite having been rendered organophilic by replacing the exchangeable inorganic cations of the bentonite with organic cations from salts of organic compounds selected from the group consisting of amines, polyamines and quaternary ammonium compounds, the improvement which comprises adding about 0.5 to 3 weight percent based on the total mixture of a dispersion agent of acetone and a compound selected from the group consisting of acetonitrile and propionitrile, said dispersion agent being about 1.5 to about 35 weight percent nitrile and the remainder acetone.

10. A method according to claim 9 wherein the dispersion agent is a mixture of acetone and acetonitrile.

11. A method according to claim 9 wherein the dispersion agent is a mixture of acetone and propionitrile.

12. A method according to claim 10 wherein the acetonitrile is employed in an amount between about 10 to about 30 weight percent, the remainder being acetone, based on the dispersion agent mixture.

13. In a process for manufacturing a bodied lubricant wherein about 2 to 15 weight percent of organophilic bentonite is dispersed in about 80 to 97 weight percent hydrocarbon lubricating oil, said bentonite having been rendered organophilic by replacing the exchangeable inorganic cations of the bentonite with organic cations from salts of organic compounds selected from the group consisting of amines, polyamines and quaternary ammonium compounds, the improvement which comprises adding about 0.5 to 3 weight percent based on the total mixture of a dispersion agent of acetone and a compound selected from the group consisting of acetonitrile and propionitrile, said dispersion agent being about 1.5 to about 35 weight percent nitrile and the remainder acetone.

14. A method according to claim 13 wherein the dispersion agent is a mixture of acetone and acetonitrile.

15. A method according to claim 13 wherein said hydrocarbon lubricating oil is a petroleum-derived paraffinic lubricating oil having a viscosity at 210° F. from about 35 to about 225 SUS.

References Cited in the file of this patent
UNITED STATES PATENTS

| | | |
|---|---|---|
| 2,531,440 | Jordan | Nov. 28, 1950 |
| 2,739,121 | Weihe | Mar. 20, 1956 |

FOREIGN PATENTS

| | | |
|---|---|---|
| 713,409 | Great Britain | Aug. 11, 1954 |

OTHER REFERENCES

"Beta-Substituted Propionitriles," page 13, New Product Bulletin by American Cyanamid.

Boner: "Lubricating Greases," Reinhold Publishing Corp. (1954), N.Y., pages 728–32.

Encyclopedia of Chem. Tech., vol. 9, published by Interscience Encylopedia Inc., N.Y. (1952), pp. 366–67.